(12) United States Patent
Herz

(10) Patent No.: US 8,199,255 B1
(45) Date of Patent: Jun. 12, 2012

(54) SYSTEM, METHOD, AND COMPUTER PROGRAM PRODUCT FOR CONFIGURING A PLURALITY OF DEVICES TO PROCESS CONTENT

(75) Inventor: William S. Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1269 days.

(21) Appl. No.: 11/742,393

(22) Filed: Apr. 30, 2007

(51) Int. Cl.
*H04N 5/44* (2011.01)
*H04N 7/173* (2011.01)
*H04N 5/77* (2006.01)
*G06F 3/048* (2006.01)

(52) U.S. Cl. ........... 348/553; 725/92; 715/818; 386/226

(58) Field of Classification Search ........................ None
See application file for complete search history.

(56) References Cited

U.S. PATENT DOCUMENTS

| | | | | |
|---|---|---|---|---|
| 7,825,986 B2* | 11/2010 | Chung | | 348/553 |
| 2001/0020958 A1* | 9/2001 | Yoo et al. | | 345/818 |
| 2006/0146184 A1* | 7/2006 | Gillard et al. | | 348/398.1 |
| 2007/0098353 A1* | 5/2007 | Chen et al. | | 386/46 |
| 2008/0282298 A1* | 11/2008 | Ganesan et al. | | 725/92 |

* cited by examiner

*Primary Examiner* — Jefferey Harold
*Assistant Examiner* — Sean Haiem
(74) *Attorney, Agent, or Firm* — Zilka-Kotab, PC

(57) ABSTRACT

A system, method, and computer program product are provided for configuring a plurality of devices to process content. In use, content information associated with received content is identified in addition to device information associated with a plurality of devices adapted for processing such content. To this end, the plurality of devices may be configured to process the content, utilizing the content information and the device information.

21 Claims, 6 Drawing Sheets

SYSTEM, METHOD, AND COMPUTER PROGRAM PRODUCT FOR CONFIGURING A PLURALITY OF DEVICES TO PROCESS CONTENT

FIELD OF THE INVENTION

The present invention relates to processing content, and more particularly to configuring devices to process content.

BACKGROUND

FIG. 1 illustrates a system 100 for processing content, in accordance with the prior art. As shown, the system 100 includes a first device 102 (e.g. high-definition set-top box, DVD player, personal computer, etc.). Such first device 102 typically feeds content to one or more intermediate devices 104 (e.g. audio/video processor, switcher, etc.) that drives an audio and/or visual presentation device 106 (e.g. a display, speakers, etc.).

During operation where the content includes video, such video is typically decoded at a first device such as a DVD player, sent to a processor or switcher, and then sent to a presentation device such as an HDTV. Each of these discrete devices is traditionally equipped with various video processing capabilities. Examples of such video processing capabilities include but are not limited to scaling, analog-to-digital conversion, digital-to-analog conversion, deinterlacing, inverse telecine, etc.

One issue with systems like that shown in FIG. 1 is that the devices are typically devoid of any information as to what upstream or downstream devices are present. This potentially leads to less than optimal or redundant processing. Just by way of example, it is not uncommon for content received in an analog format to be converted to a digital format, then be converted back to an analog format, and yet again be converted to a digital format, before being displayed. Another example of such inefficiencies may involve the conversion of content having a 720 line progressive format (720P) to a 1080 line interlaced format (1080I) via a set-top box, only to be subsequently deinterlaced and scaled down to a 1366×768 progressive format (1366×768P) (the native resolution of the display), rather than simply converting from the 720P format to the 1366×768 P format. Of course, these examples are set forth for illustrative purposes only and should not be construed as limiting in any manner whatsoever.

There is thus a need for addressing these and/or other issues associated with the prior art.

SUMMARY

A system, method, and computer program product are provided for configuring a plurality of devices to process content. In use, content information associated with received content is identified in addition to device information associated with a plurality of devices adapted for processing such content. To this end, the plurality of devices may be configured to process the content, utilizing the content information and the device information.

DETAILED DESCRIPTION

Figure 1:
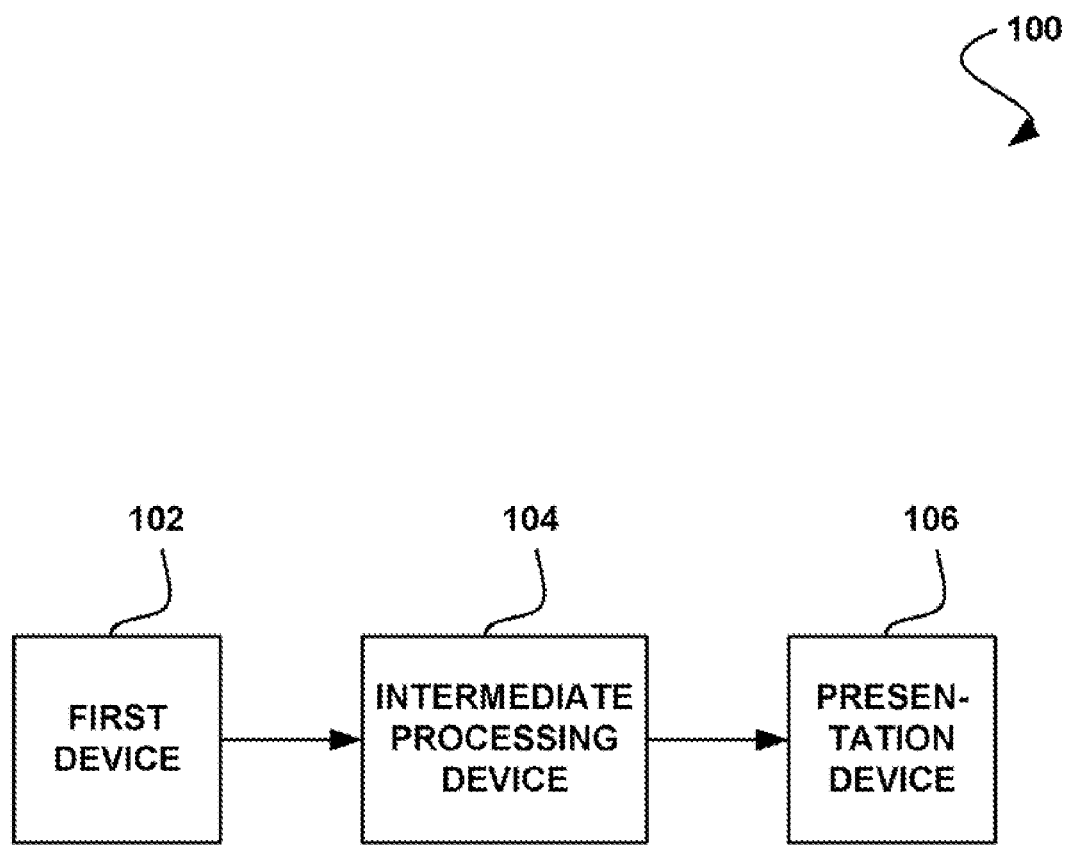
FIG. 1 illustrates a system for processing content, in accordance with the prior art.
Figure 2:
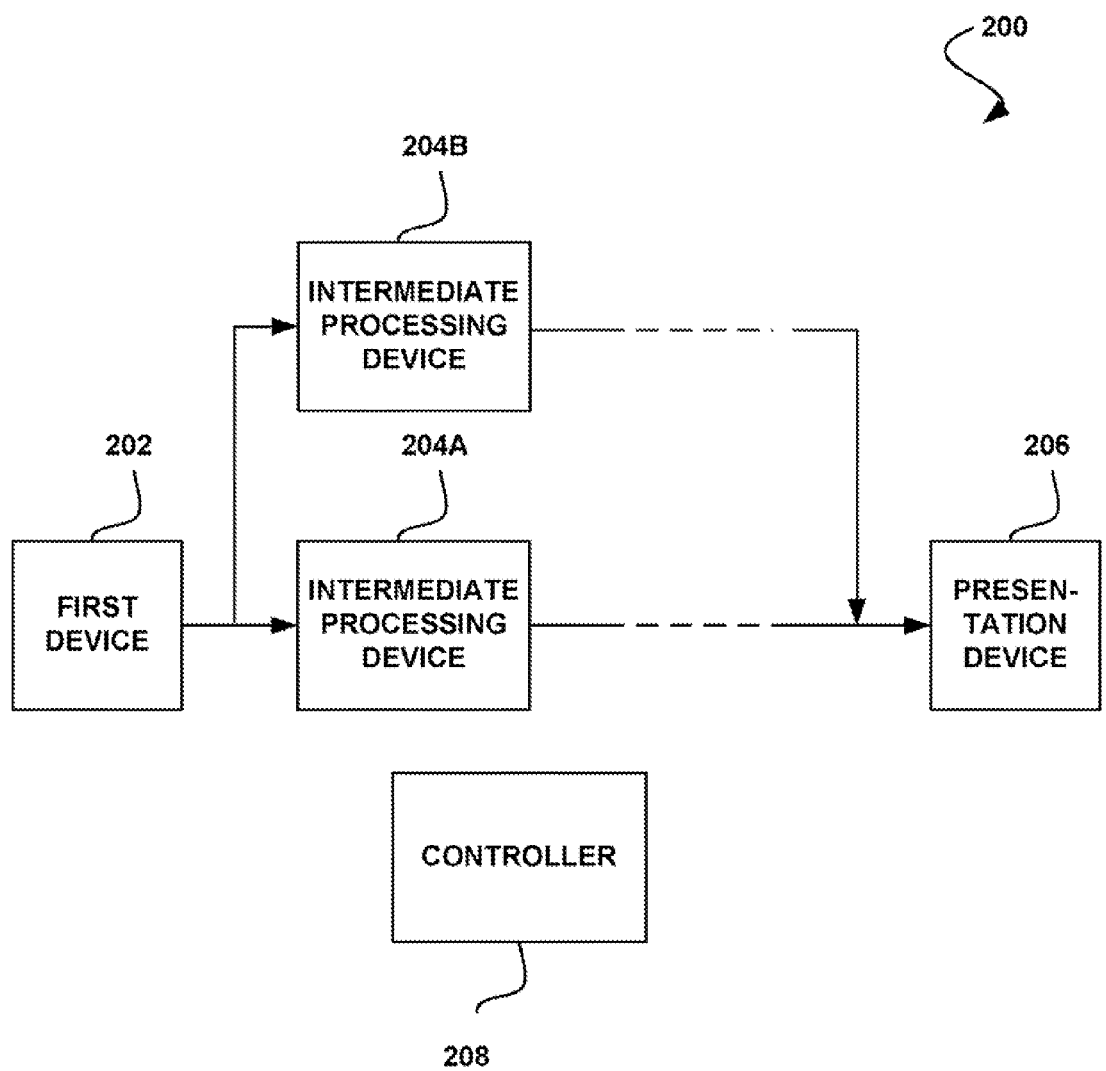
FIG. 2 shows a system for configuring a plurality of devices to process content, in accordance with one embodiment.

FIG. 2 shows a system 200 for configuring a plurality of devices to process content, in accordance with one embodiment. As shown, included is a plurality of devices for processing the content. In particular, at least one first device 202 is provided for providing content to one or more intermediate processing devices 204A, 204B. Such intermediate processing devices 204A, 204B, in turn, process the content before communicating the same to at least one presentation device 206.

In the context of the present description, the aforementioned content may include video, one or more images, pixels, audio, textual or other visual information, and/or any other content capable of being processed. Further, processing of the content may include any processing associated with initial, intermediate processing, and/or presentation of the content. As will soon become apparent, the aforementioned devices may be configured to process the content by way of a controller 208.

Also in the context of the present description, the first device 202 may include any device capable of providing the content to at least one other device. In various embodiments, the first device 202 may obtain the content via a portable media, a network, an original source (e.g. a camera, etc.), etc. For example, the first device 202 may include a cable or satellite set-top box, Internet adapter, media (e.g. CD, DVD, etc.) player, personal computer, gaming device, mobile computing device [e.g. personal digital assistant (PDA) device, mobile phone device, etc.].

With continuing reference to FIG. 2, the intermediate processing, devices 204A, 204B may include any device situated between the first device 202 and the presentation device 206. Further, while two intermediate processing devices 204A, 204B are shown, it should be noted that zero, or three or more of such devices may exist. Still yet, while the intermediate processing devices 204A, 204B are shown to be configured in parallel, it should be noted that both parallel and/or serial configurations are contemplated. Examples of the intermediate processing devices 204A, 204B include, but are certainly not limited to a video and/or audio processor, a switcher, an equalizer, and/or any other desired processor, for that matter.

Moving now to the presentation device 206, such device may include any device capable of presenting the content. For example, the presentation device 206 may include a display in the form of a computer monitor, television [e.g. high-definition television (HDTV), etc.], mobile device screen, etc. As yet another example, the presentation device 206 may include speakers, etc. for presenting audio content.

In FIG. 2, the controller 208 is shown to reside separate from the remaining devices. In such embodiment, the controller 208 may communicate with one or more of the other devices via a hard-line or wireless communication medium utilizing the necessary control protocols associated with the devices. Of course, it should be noted that other embodiments are contemplated where the controller 208 or one or more components thereof are integrated, retrofitted, etc. on the first device 202, intermediate processing devices 204A, 204B, and/or presentation device 206, etc. In a similar manner, various embodiments are contemplated where of the first device 202, intermediate processing devices 204A, 204B, and/or presentation device 206, etc. (or components thereof) may or may not be integrated with each other in the form of any combination of hardware and/or software.

In use, the controller 208 serves to identify content information associated with the content in addition to device information associated with a plurality of the devices 202, 204A/B, 206. To this end, a plurality of the devices 202, 204A/B, 206 may be configured to process the content, utilizing such content information and device information. More information regarding such configuration will now be set forth in greater detail during the description of FIG. 3.

Figure 3:
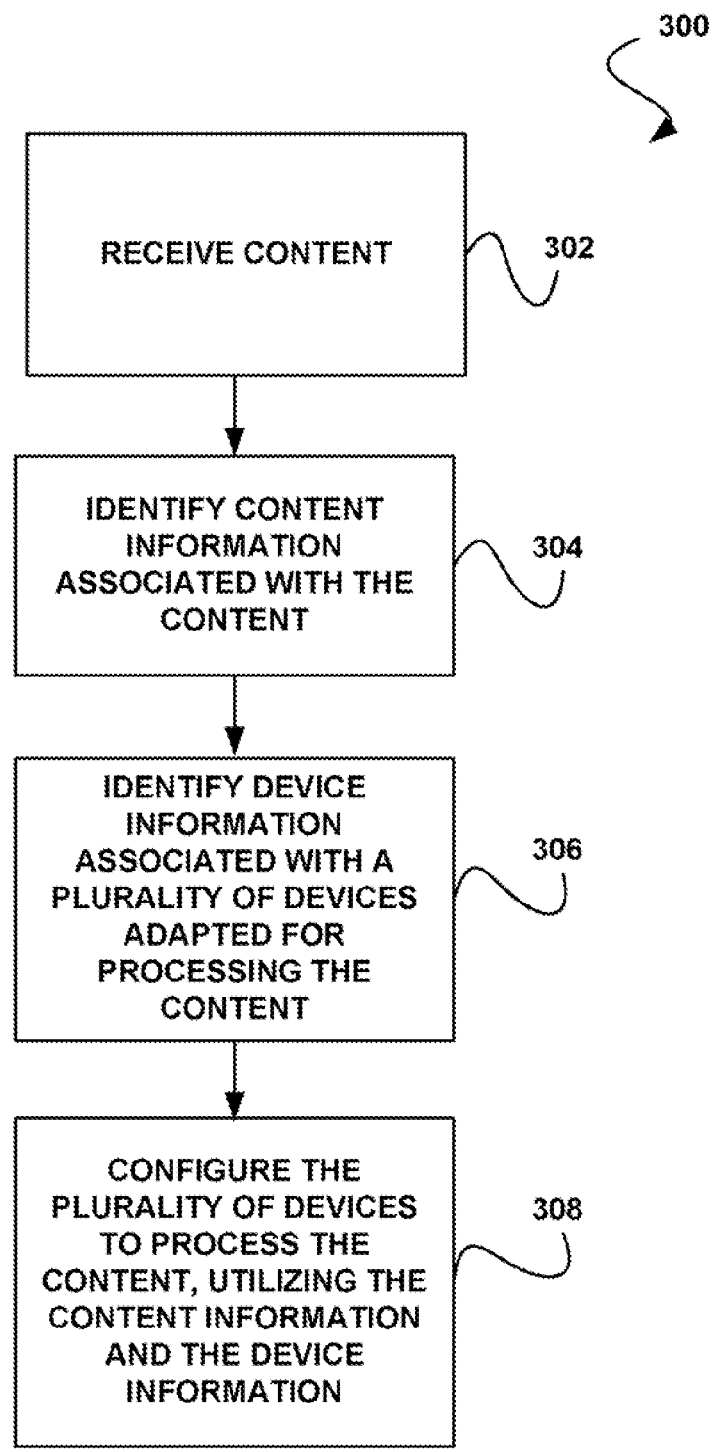
FIG. 3 shows a method for configuring a plurality of devices to process content, in accordance with another embodiment.

FIG. 3 shows a method 300 for configuring a plurality of devices to process content, in accordance with another embodiment. As an option, the method 300 may be carried out in the context of the system 200 of FIG. 2. Of course, however, the method 300 may be implemented in any desired environment. Further, the previously mentioned definitions equally apply to the description of the present embodiment.

As shown, content is received in operation 302 utilizing a first device (e.g. first device 202 of FIG. 2, etc.). Further, content information associated with such content is identified. See operation 304. Such content information may be identified utilizing a local or remote database of content information; an electronic program guide (EPG) an inspection of the content itself by reviewing header information, performing a heuristic analysis on the content, etc.; and/or any other technique for obtaining the desired content information.

In the context of the present description, the content information may include any information that describes or relates to the content. In various embodiments, such content information may identify a source of the content (e.g. film, video, etc.), a medium over which the content was received (e.g. portable medium, network, etc.), a protocol with which the content was received (e.g. network protocol, etc.), a format of the content. (e.g. compression algorithm, etc.), a resolution of the content, a scan structure of the content (e.g. progressive, interlaced, etc.), and/or color data associated with the content. Of course, such exemplary content information is set forth for illustrative purposes only and should not be construed as limiting in any manner whatsoever.

With continuing reference to FIG. 3, it shown that also identified is device information associated with a plurality of devices adapted for processing the aforementioned content (e.g. devices 202, 204A/B, 206 of FIG. 2, etc.). Note operation 306. Similar to the content information, it should be noted that the device information may be identified utilizing a local or remote database of device information (which may or may not be the same as the database storing the content information), an inspection of the device itself (e.g. by way of mono-directional or hi-directional communication, etc.), and/or any other technique for obtaining the desired device information.

in the context of the present description, the device information may include any information that describes or relates to the devices. For example, in one embodiment, the device information may identify device processing capabilities. In various optional embodiments, such device processing capabilities may each be characterized in terms of a type, quality, efficiency, etc, of the relevant capability. Examples of such processing capabilities include, but are certainly not limited to scaling, frame rate conversion, analog-to-digital conversion, digital-to-analog conversion, deinterlacing, inverse telecine, color correction, scaling, edge enhancement, noise reduction, display resolution, display color characteristics, display scan line structure, gamma correction, motion estimation, motion compensation, brightness, saturation, overlay processing, flicker reduction, pixel overdrive, black stretch, contrast enhancement, pre-emphasis, de-emphasis, etc.

In operation 308, the aforementioned content/device information is utilized for configuring the devices to process the content in an improved manner. In the context of the present description, the foregoing configuration may refer to any configuring of the devices that results in an improvement in the manner in which the content is processed. Just by way of example, the configuration may include a selection of at least one of the plurality of devices to process the content. For instance, one device may be selected to process the content instead of (or before) another, etc. In another embodiment, the configuration may include the optimization of at least one of the plurality of devices to better process the content.

Of course, the foregoing configuration may be carried out for any desired purpose. In some optional embodiments, the configuration may possibly result in higher quality processing, and/or more efficient processing (e.g. removal of redundant or superfluous processing, etc.), etc. Further, the configuration of operation 308 may be carried out with any desired degree of automation (e.g. completely automatic, requiring minimal user input, etc.).

More illustrative information will now be set forth regarding various optional architectures and features with which the foregoing framework may or may not be implemented, per the desires of the user. Thus, it should be strongly noted that the following information is set forth for illustrative purposes and should not be construed as limiting in any manner. Any of the following features may be optionally incorporated with or without the other features described.

Figure 4:
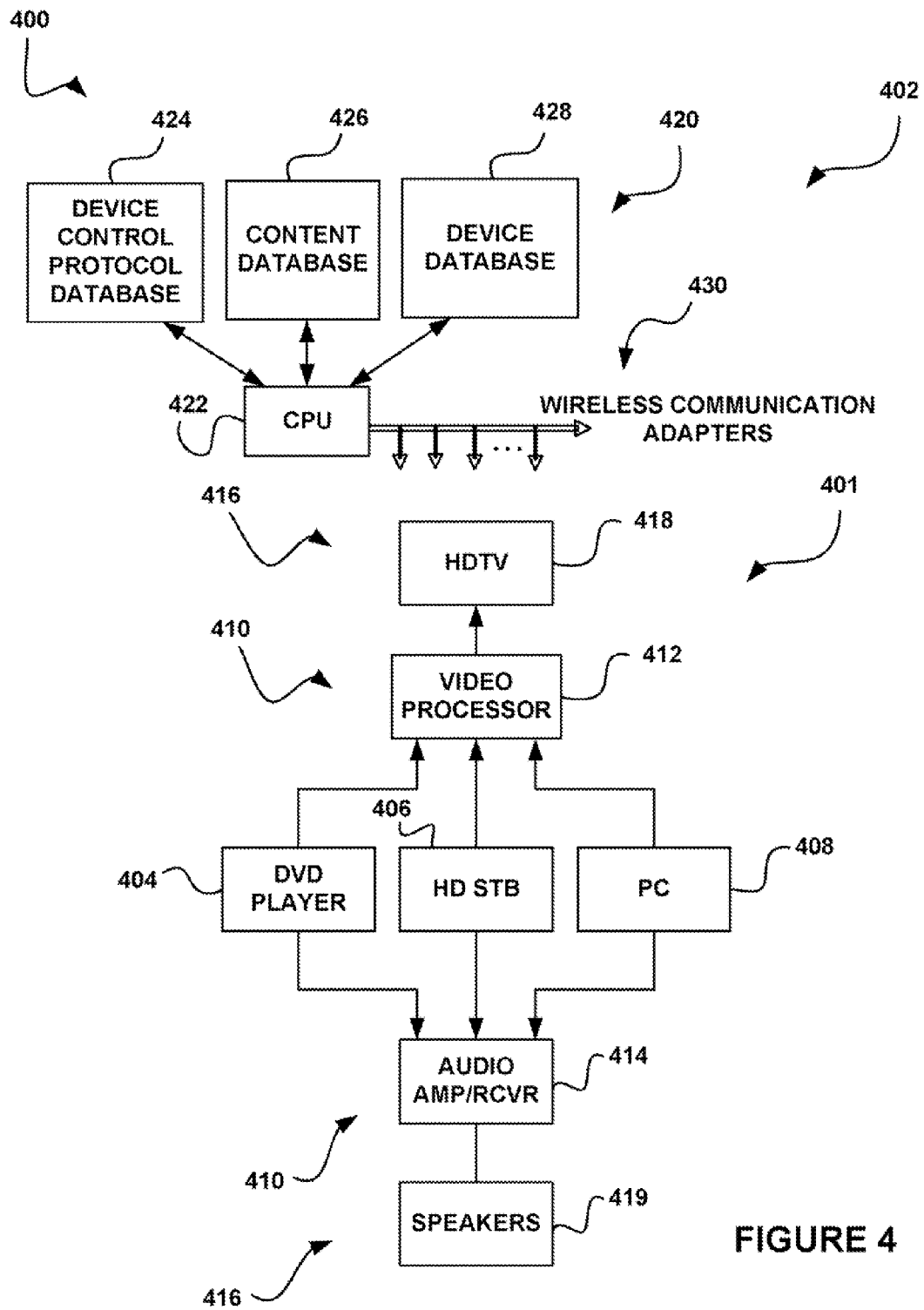
FIG. 4 shows a system for configuring a plurality of devices to process content, in accordance with yet another embodiment.

FIG. 4 shows a system 400 for configuring a plurality of devices to process content, in accordance with yet another embodiment. As an option, the system 400 may be implemented in the context of the structure and/or functionality set forth during the description of the previous figures. Of course, however, the system 400 may be implemented in any desired environment. Further, the previously mentioned definitions equally apply to the description of the present embodiment.

As shown, a home entertainment apparatus 401 is provided including a plurality of first devices 402 in the form of a DVD player 404, an HD set-top box 406, and a personal computer 408. Such first devices 402, in turn, feed a plurality of intermediate devices 410. Specifically, the first devices 402 feed video content to a video processor 412, and audio content to an audio amplifier/receiver 414, in the manner shown.

Finally, presentation devices 416 are provided for presenting the content. As shown, the video content is shown to be communicated from the video processor 412 to an HDTV 418, while the audio content is shown to be communicated from the audio amplifier/receiver 414 to a plurality of speakers 419.

Further included is a control apparatus 420 that communicates with the home entertainment apparatus 401. As shown, the control apparatus 420 comprises a central processor 422 that receives information from a plurality of databases including a device control protocol database 424 including protocol information associated with different protocols for use in controlling a diverse array of different devices. In various embodiments, such protocols may be adapted to control the devices by accessing processing parameters, turning on/off various processing capabilities, accessing non-user serviceable controls (e.g. provided by manufacturers in conjunction with a driver, etc.), etc. As further shown, the central processor 422 of the control apparatus 420 may further receive information from a content database 426 including content information, and a device database 428 including device information.

While such databases are shown to reside locally with respect to the central processor 422, it should be noted that embodiments are contemplated where one or more of the databases are situated remotely, whereby access may be afforded via a network (e.g. the Internet, etc.), in one embodiment, the databases may be administered by the same entity which provides the control apparatus 420. In other embodiments, an independent entity may be relied upon for generating and/or maintaining the databases. In any case, the databases may optionally be updated, as desired. For example, as new devices or content types are brought to market and/or used, such databases may be updated to reflect the same.

With continuing reference to FIG. 4, the control apparatus 420 is shown to further include a plurality of wireless communication adapters 430 for allowing the central processor 422 to communicate and thus configure the first devices 402, intermediate devices 410, and/or presentation devices 416. In one embodiment, such wireless communication adapters 430 may include infrared (IR) and/or radio frequency (RF) "blasters," or the like. Of course, other embodiments are contemplated where a hardwire coupling is employed, the control apparatus 420 (or component(s) thereof) are integrated into one or more of the devices themselves, and/or a control signal is embedded with or accompanies the content itself.

In use, the central processor 422 is adapted for identifying content information associated with the content being received from one of the first devices 402. This may be accomplished by identifying the content and using the content database 426 as a look-up table, and/or any of the other aforementioned techniques. Still yet, device information associated with any of the devices of FIG. 4 may be identified using the device database 428 as a look-up table, etc.

Equipped with this information, the central processor 422 is capable of determining an optimal configuration of the devices in view of the specific content and the device capabilities, etc. To carry out such configuration, device identifiers may be used to look-up the appropriate control protocol via the device control protocol database 424. While only content/device information is shown to contribute to the configuration of the devices, it should be noted that user input may optionally be received such that the devices may be configured to process the content, utilizing the user input. For example, user feedback may provide video processing benchmarking to identify which devices perform certain processing in an optimal manner with the highest quality (from a user perspective), etc.

The above described configuration technique may be automatically and/or manually prompted, as desired. For example, the configuration may be automatically prompted upon receipt of new content that is different from current content (e.g. when a new channel is selected, a new portable media is accessed, etc.), upon the detection of a change in the home entertainment apparatus 401 (e.g. the addition/removal/reconfiguration of a device, etc.), and/or upon the receipt of an update of information in conjunction with any of the databases. Of course, a manually prompted configuration is also contemplated.

By way of example only, the configuration of the devices may serve to eliminate redundant or detracting analog-to-digital conversion, digital-to-analog conversion, upscaling, downscaling, frame rate conversions, color conversions, etc. For example, the central processor 422 may identify situations where an analog-to-digital conversion is carried out on content by one device only to be converted back to analog by another device. As another example, the central processor 422 may identify situations where upscaling is performed by a device and downscaling is performed by another. In some cases, such redundant processing and any resultant sampling, etc. may result in a degradation of content quality (which may, in some embodiments, be avoided by the appropriate configuration).

Thus, by identifying such situations and the relevant information, the central processor 422 is adapted for removing any redundant processing and/or possibly improving a quality of content processing. A very specific example of one way the central processor 422 may improve processing will be set forth in during the description of FIGS. 54-5B. Of course, the examples set forth herein are provided for illustrative purposes only and should not be construed as limiting in any manner.

Figure 5A:
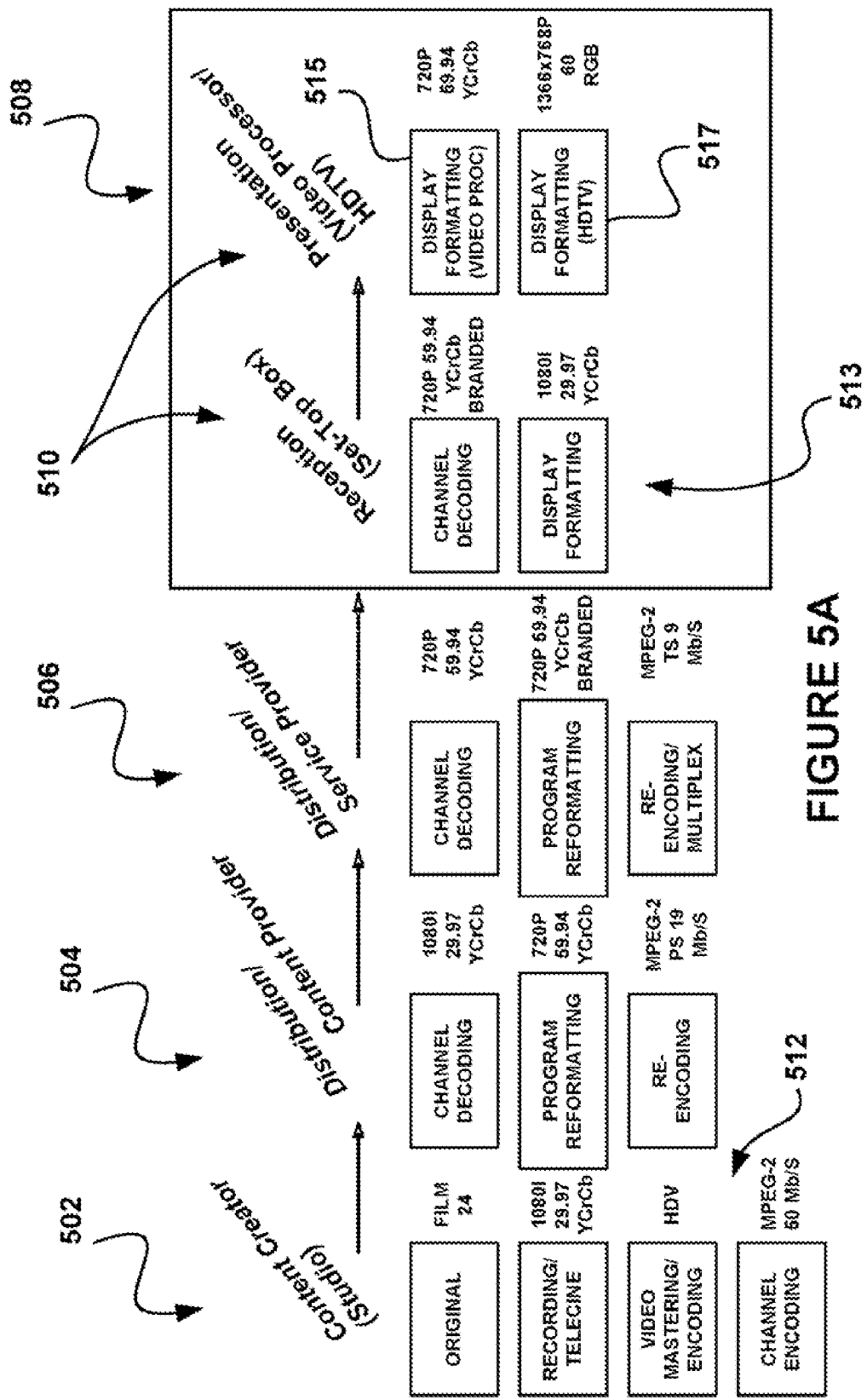
FIGS. 5A-5B illustrate an exemplary system showing the configuration of a plurality of devices to process content, in accordance with a possible embodiment.
Figure 5B:
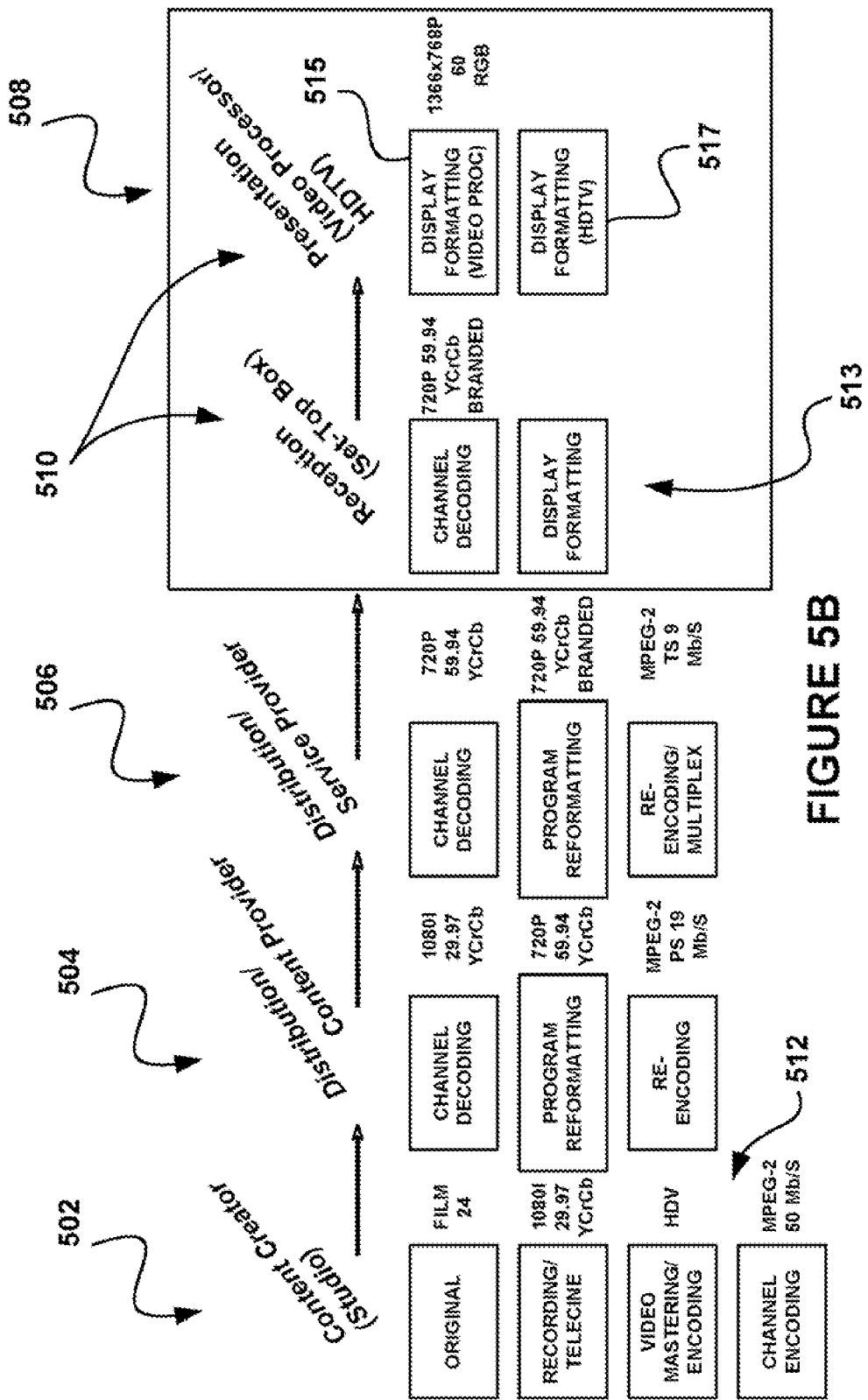

FIGS. 5A-5B illustrate an exemplary system 500 showing the configuration of a plurality of devices to process content, in accordance with a possible embodiment. As an option, the exemplary system 500 may be implemented in the context of the structure and/or functionality set forth during the description of the previous figures. Of course, however, the exemplary system 500 may be implemented in any desired environment.

Specifically, FIG. 5A shows the system 500 prior to any configuration of the relevant devices. Further, FIG. 5B shows the system 500 after configuration of the relevant devices, for optimization purposes.

As shown in FIGS. 5A-5B, content is shown to be generated by a content creator 502 such as a studio. As shown, such content is, in turn, provided to a distribution/content provider 504 (e.g. HBO, SHOWTIME, etc.). The distribution/content provider 504 then provides the content to a distribution/service provider 506 (e.g. DIRECTV, etc). In use, the distribution/service provider 506 makes the content accessible by a number of home entertainment apparatuses 508. Each home entertainment apparatus 508 includes a plurality of devices (e.g. first, intermediate, presentation, etc.) that are each capable of processing the content for ultimate presentation to a user.

With specific reference to FIG. 5A (prior to configuration), it is shown that each of the foregoing stages includes a plurality of processing capabilities 512 that result in the content having different characteristics (e.g. various resolutions, scan structure, etc.). Just by way of example, the content creator 502 may begin with content having a film format and a frame rate of 24 frames per second (FPS). Thereafter, telecine processing is carried out such that the content subsequently has a 1080 line interlaced format (1080I) with 29.97 FPS. Thereafter, the distribution/content provider 504 and the distribution/service provider 506 further process the content in the manner shown in FIG. 5A, resulting in a 720 line progressive format (720P) being fed to each home entertainment apparatus 508

With particular attention to various devices 510 of the home entertainment apparatuses 508, it is shown that a set top box device 513 performs channel decoding processing that results in the content having the illustrated 720P format, after which display formatting converts the content resulting in a 1080I format, as shown. Thereafter, a video processor device 515 performs additional display formatting resulting in a 720P format. Further, a display device 517 in the form of an HDTV performs additional display formatting to convert the content so as to have a 1366×768 progressive format (1366× 768P), as shown.

Turning now to FIG. 5B (after configuration), a controller (not shown) may recognize that the display device 517 is of a progressive scan-type and has a native resolution of 1366×768, utilizing relevant device information. Further, information may be identified associated with the content to ascertain that it is arriving at the set-top box device 513 in a 720P format. It may also be recognized (again, from device information), that the best scalar processing amongst the set-top box device 513, the video processor device 515, and the display device 517 resides in the video processor device 515.

As a result, format conversion, scaling, and interlace capabilities of the set-top box device 513 may be disabled, as shown in FIG. 5B. Additionally, the set-top box device 513 need not necessarily downscale the content, only to have the display device 517 upscale the same. Thus, the present embodiment may ensure that the content retain its original format to the extent possible. Further, in a situation where the content is converted to match characteristics of a particular display, the configuration may ensure that such conversion occurs as few times as possible, while using the best processing algorithm amongst a chain of devices. Again, the configurations illustrated in FIG. 5B are set forth for illustrative purposes only and should not be construed as limiting in any manner whatsoever.

Further, similar or different configurations may be applied throughout the content chain, and not just at the point of content consumption (e.g. at the home entertainment apparatuses 508, etc.). This may be particularly the case as more and more content is delivered utilizing Internet protocol, allowing multiple versions of the same content, etc.

It should be noted that various techniques are contemplated for charging users for the configuration of the various devices. For example, a periodic subscription fee may be required for continued operation of the control apparatus 420. As a further option, a fee may be required in conjunction with the information associated with the aforementioned databases, or updates to such information.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving content;
   identifying content information associated with the content;
   identifying device information associated with a plurality of hardware devices adapted for processing the content, the device information including processing capabilities of each of the plurality of hardware devices;
   selecting at least one of the plurality of hardware devices to process the content;
   identifying a control protocol for accessing processing parameters of the at least one selected hardware device;
   determining a configuration for the at least one selected hardware device, utilizing the content information and the device information; and
   configuring the at least one selected hardware device to process the content by implementing the determined configuration for the at least one selected hardware device, utilizing the control protocol.

2. The method of claim 1, wherein the content includes at least one of video, audio, and pixels.

3. The method of claim 1, wherein the content information identifies at least one of: a source of the content, a medium over which the content was received, a protocol with which the content was received, a format of the content, a resolution of the content, a scan structure of the content, and color data associated with the content.

4. The method of claim 1, wherein the plurality of devices include at least one of a first device, an intermediate processing device, and a presentation device.

5. The method of claim 1, wherein the processing capabilities include at least one of scaling, frame rate conversion, analog-to-digital conversion, digital-to-analog conversion, deinterlacing, inverse telecine, color correction, scaling, edge enhancement, noise reduction, display resolution, display color characteristics, display scan line structure, gamma correction, motion estimation, motion compensation, brightness, saturation, overlay processing, flicker reduction, pixel overdrive, black stretch, contrast enhancement, pre-emphasis, and de-emphasis.

6. The method of claim 1, wherein at least one of the content information and the device information is stored in a database.

7. The method of claim 1, wherein the configuring is performed by a controller in communication with the plurality of hardware devices.

8. The method of claim 7, wherein the controller is integrated in at least one of the plurality of hardware devices.

9. The method of claim 7, wherein the controller is physically separate from the plurality of hardware devices.

10. The method of claim 7, wherein the controller communicates with at least one of the plurality of hardware devices utilizing wireless communication.

11. The method of claim 7, wherein the controller communicates with the plurality of hardware devices utilizing a plurality of different protocols.

12. The method of claim 11, wherein the different protocols are stored in a database.

13. The method of claim 1, and further comprising receiving user input, wherein the plurality of devices are configured to process the content, utilizing the user input.

14. The method of claim 1, and further comprising charging for the configuring.

15. A data structure embodied on a non-transitory computer readable medium, comprising:
   a database including content information associated with content, and device information associated with a plurality of hardware devices adapted for processing the content, the device information including processing capabilities of each of the plurality of hardware devices;
   wherein at least one of the plurality of hardware devices is selected to process the content, and a control protocol is identified for accessing processing parameters of the at least one selected hardware device;
   wherein the data structure is operable such that a configuration for the at least one selected hardware device is determined utilizing the content information and the device information;
   wherein the content information and the device information of the database are accessed for configuring, utilizing the control protocol, the at least one selected hardware device to process the content by implementing the determined configuration for the at least one selected hardware device.

16. A system, comprising:
   a controller capable of:
      identifying content information associated with content and device information associated with a plurality of hardware devices adapted for processing the content, the device information including processing capabilities of each of the plurality of hardware devices, selecting at least one of the plurality of hardware devices to process the content, identifying a control protocol for accessing processing parameters of the at least one selected hardware device, determining a configuration for the at least one selected hardware device, utilizing the content information and the device information, and configuring the at least one selected hardware device plurality of devices to process the content by implementing the determined configuration for the at least one selected hardware device, utilizing the control protocol.

17. The system of claim 16, and further comprising at least one database coupled to the controller for storing at least one of the content information and the device information.

18. The method of claim 1, wherein the device information is identified utilizing a local or remote database of device information.

19. The method of claim 1, wherein the device information is identified utilizing an inspection of the device itself by way of mono-directional or bi-directional communication.

20. The method of claim 1, wherein the device information includes a characterization of the processing capabilities of each of the plurality of hardware devices, the characterization including at least one of a type, a quality, and an efficiency of each of the processing capabilities.

21. The method of claim 13, wherein the user input is utilized for benchmarking and identifying which of the plurality of hardware devices perform a particular processing in an optimal manner from a user perspective.

* * * * *